United States Patent [19]

Morrison

[11] Patent Number: 4,794,052
[45] Date of Patent: Dec. 27, 1988

[54] DISPOSABLE BROILER PAN AND MATERIAL FOR FORMING SAME

[76] Inventor: Marlene C. Morrison, 463 Holly Rd., Blue Bell, Pa. 19422

[21] Appl. No.: 159,205

[22] Filed: Feb. 23, 1988

Related U.S. Application Data

[63] Continuation-in-part of Ser. No. 688,792, Jan. 4, 1985, abandoned.

[51] Int. Cl.⁴ .............................................. B21C 37/02
[52] U.S. Cl. ..................................... 428/595; 428/603
[58] Field of Search .................... 428/595, 606, 603

[56] References Cited

U.S. PATENT DOCUMENTS

| | | | |
|---|---|---|---|
| 2,673,003 | 3/1954 | Stewart | 220/72 |
| 2,880,860 | 4/1959 | Gardiner, Jr. et al. | 206/58 |
| 3,677,438 | 7/1972 | Esposito | 221/63 |

Primary Examiner—Ellis P. Robinson
Assistant Examiner—P. R. Schwartz
Attorney, Agent, or Firm—Howson & Howson

[57] ABSTRACT

A flexible foil product formable into a disposable broiler pan comprises a pleated sheet of metal foil having its pleats folded over throughout their lengths. The broiler pan is formed by folding side edges of the sheet upwardly and then manually raising the pleats to form food-supporting ridges. The pleated foil is dispensable either from a roll or it can be packaged in flat sheets.

2 Claims, 2 Drawing Sheets

DISPOSABLE BROILER PAN AND MATERIAL FOR FORMING SAME

CROSS-REFERENCE TO RELATED APPLICATION

This is a continuation-in-part of my copending application Ser. No. 688,792, filed Jan. 4, 1985, now abandoned.

BRIEF SUMMARY OF THE INVENTION

This invention relates to a disposable broiler pan and a material from which the pan is formed. In particular, the invention relates to a pleated foil sheet which is packageable in roll or sheet form. The foil can be cut to size, if necessary, and can then be formed into a broiler or baking pan having a ridged bottom which allows fat and cooking juices to drain and collect below the level of the food being cooked.

In the past, extensive use has been made by householders of metal foils, such as aluminum foil. Metal foil is used in particular as a liner for pans, ovens and the like where the heat conductive and reflective properties of the foil as well as its relative rigidity are useful in many and varied applications.

One application of foil has been its use as a disposable broiler pan. In this instance, a semi-rigid foil is formed into a finished, pre-shaped rigid pan. An example of such a pan is described in L. E. Stewart U.S. Pat. No. 2,673,003, dated Mar. 23, 1954. These pans are usually placed in a box in a stacked or nested arrangement and then sold to the customer. The box or package for the foil broiler pans or the like usually is bulky and does not lend itself to convenient storage. Because the pans are stacked in this way, they are not easily separated from each other for use. Since the box containing the pans takes up a large amount of space, the householder will be inclined to store the pans, and the box in which they are supplied, in a very inconvenient place. Furthermore, pre-shaped rigid pans are expensive. Their high cost has been a deterrent to their use and often motivates users to wash and continually reuse them instead of discarding them after use. Therefore, pre-shaped rigid pans do not fulfill their design purpose, but instead serve as substitute permanent-type pans.

The many operations needed to fabricate the finished pre-shaped, rigid pan adds to its final purchase price. A further disadvantage is that pre-shaped, rigid pans do not easily compress under finger pressure. Disposal is therefore unwieldy and cumbersome for the average householder.

Gardiner et al. U.S. Pat. No. 2,880,860, dated Apr. 7, 1959 describes a corrugated semi-rigid foil which can be rolled and dispensed from a roll. The foil is 0.001 to 0.004 inches in thickness. This thickness is necessary as the Gardiner corrugations are "open", i.e. either V-shaped or flat topped, so that the walls of the upstanding corrugations extend approximately 45° to the horizontal. This design has limited the thickness range for the foil and has required the preferred foil to be made of aluminum alloy of full hard temper which is more expensive than non-alloy aluminum foil commonly found in grocery stores. Gardiner has walked a fine line of departure from rigid pre-shaped foil pans to a semi-rigid foil which is rigid enough to require perforation lines for cutting off sections and for folding up sides. The placement of these perforation lines limits the size choice for a pan and the height of the sides. The tempered material limits one's ability to form the material under finger pressure. The corrugations, if uniform in size, prevent proper nesting of adjacent layers when the material is rolled. Conversely, manufacturing the material with non-uniform corrugations which would allow proper nesting on a roll, would greatly increase its cost. If the material were provided in nested sheets, the corrugations would prevent one sheet from sliding over an adjacent sheet in the direction transverse to the corrugations and would also inhibit sliding in a direction parallel to the corrugations.

Others have introduced dispensable disposable pan liners. For example Esposito U.S. Pat. No. 3,677,438 describes tube-dispensed foil pan liners on the form of funnels unfoldable into discs. These liners are not strong enough to be used alone, and they do not have ridges high enough to enable them to be used as raised bottom, juice-draining broiler pans.

The present invention provides a formable foil product which has the advantages of ordinary household aluminum foil, i.e. it can be packaged as a substantially flat sheet or in rolls, and can be easily dispensed from a box, can be easily cut to size. The formable foil product can be easily formed into a broiler pan having upstanding enclosure walls and a rigid flat bottom, and can be easily disposed of by folding, crimping or balling up with finger pressure. It does not have the disadvantages of the more expensive rigid foil pans. Nor does it have the disadvantages of semi-rigid corrugated materials which require pre-formed fold crimps and perforation lines and which have no flat bottom.

The principal object of this invention is to provide such a formable foil product which is easy and economical to use and inexpensive to manufacture and which is intended for disposal following use, thereby eliminating the need for clean up.

The objects of the invention are realized in a roll-dispensable flat-laying aluminum foil sheet, or in individually dispensable substantially flat sheets. In either case, the sheet has a plurality of pleats extending from one side edge to the other, each pleat being folded over throughout substantially its entire length so that its thickness is approximately three times the foil thickness. The foil is easily cut to any appropriate size. The pleats are raised, using moderate finger pressure, to stand vertically off of the plane of the foil sheet to form spaced, parallel food-supporting ridges. The edges of the section can likewise, using finger pressure, be bent to stand upwardly and crimped together to form an enclosure wall of any desired height or shape. A free-standing broiling or cooking pan with a flat bottom and a plurality of upstanding ribs is thereby quickly constructed. Using the same procedure, a long sheet or belt of the ribbed material may be assembled for use in assembly line cooking in food processing factories, or in commercial applications such as restaurants and institutions. Likewise, this assembled material can be used in industrial processing unrelated to food.

The spacing between pleats, the size or height of the pleats and the tensile and compression strengths of the foil material can be varied to accommodate lighter and heavier pieces of meat. The plurality of upstanding ribs provides a grill-type surface upon which a piece of meat, bacon or other food is placed to cook, while the flat foil expanses between the bottoms of the ribs form reservoirs to collect fat and juices The features and advantages of the invention will become readily apparent from a reading of the following detailed description of the invention with the accompanying drawings in which like numerals refer to like elements.

DETAILED DESCRIPTION

Figure 1:
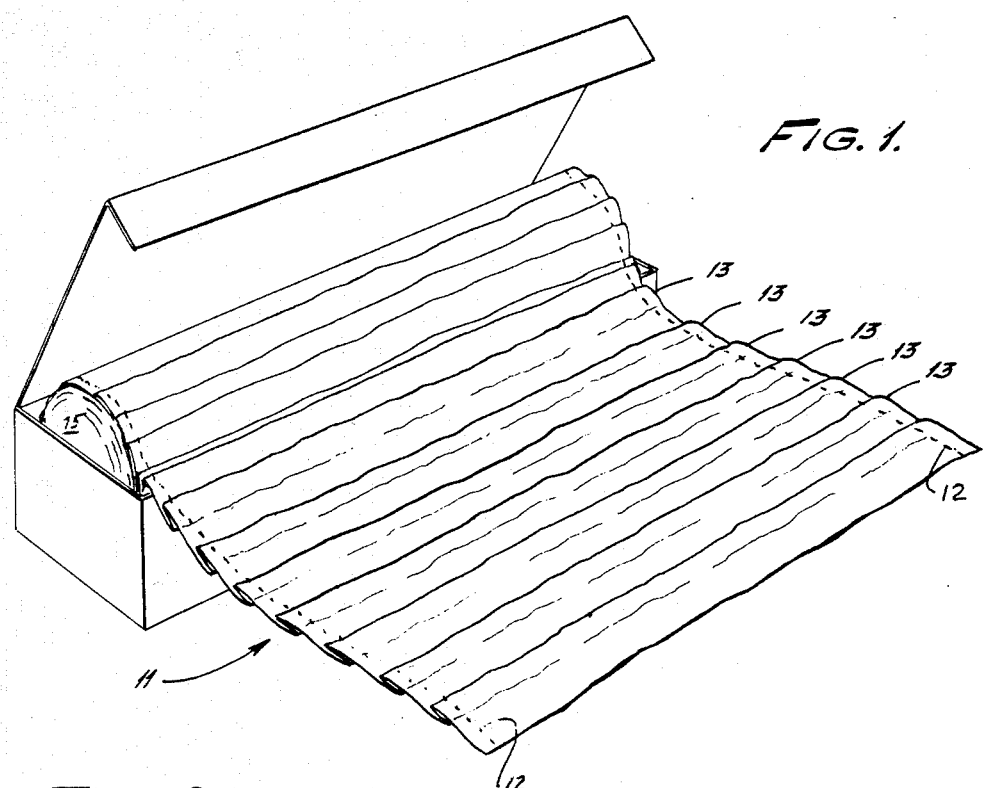
FIG. 1 is a perspective view showing a roll of pleated foil in accordance with the invention, with a portion of the foil partially dispensed from the roll.
Figure 2:
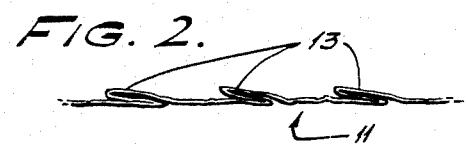
FIG. 2 is an edge view of the pleated foil of FIG. 1.

As shown in FIG. 1, a pleated pliable sheet material 11 is formed from a uniformly thin sheet of metal foil, e.g. aluminum foil, and contains a plurality of pleats 13 along its length. Sheet 11 feeds off of a roll 15 as a ribbon. The pleats 13 extend from one side edge of the sheet to the other, and each pleat is folded over throughout substantially its entire length so that the thickness of the pleat is approximately three times the foil thickness. All of the pleats 13 are folded over in the same direction as shown in FIG. 2. A single score line or crimped edge 12 (FIG. 1) extends along each side of the sheet 11 and serves to hold the pleats together, i.e. to resist pulling apart when the sheet 11 is pulled off the roll 15. This line 12 can either run the entire length of the sheet 11 or it can be broken so that each pleat 13 has its own stamp or crimp mark. If the score line 12 is made from pin holes, there will be a weak interlocking of the pleats so that they can be either separated under finger pressure or left intact.

Figure 3:
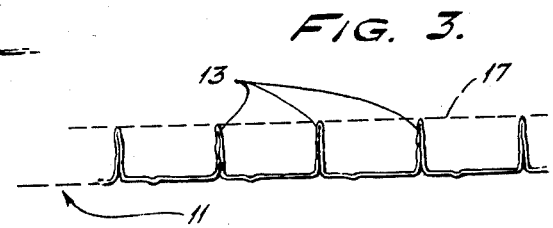
FIG. 3 is an edge view of the pleated foil of FIG. 2 with the pleats raised to stand upwardly.

As shown in FIG. 3, the pleats 13 are capable of being raised, by application of finger pressure, to stand upwardly normal to the plane of the sheet material extending between the pleats which ultimately forms the floor of the pan being formed. Each upstanding pleat comprises two foil layers connected to each other by a reverse fold and situated in planes perpendicular to the pan floor. The opposed inner faces of the foil layers in each pleat remain in contact with each other over substantially their entire areas so that the upstanding pleat forms a rib 13. The reverse folds at the upper edges of ribs 13 as a group provide a grill-like surface in plane 17 which is parallel to and above the plane of the pan floor.

Figure 4:
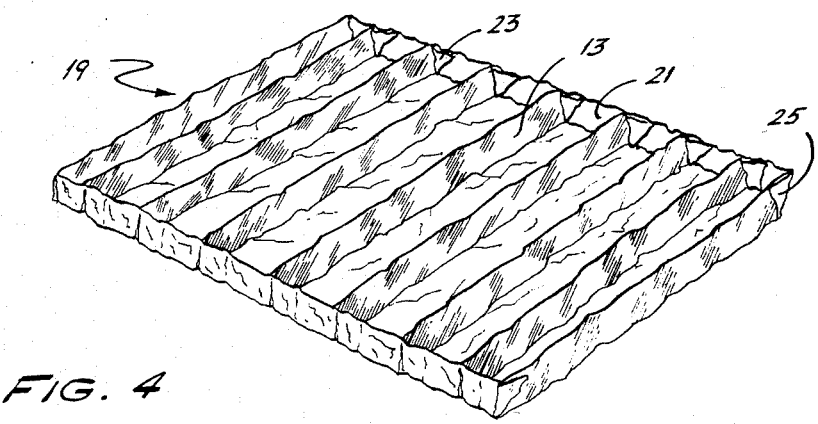
FIG. 4 is a perspective view of a broiler pan assembled from a section cut from the pleated foil sheet.

A section is cut from the sheet material 11 using household scissors of a knife or a serrated bar of a type found on commercially available household wrap dispensers or box containers. This section is formed into a broiler pan configuration 19, as shown in FIG. 4, by bending upwardly under finger pressure the outer edges of the sheet to form a side wall 21 and a similar opposite side wall. The portion of each upstanding pleat where it meets the side wall is continued in the form of a triangular fold 23 crimped to lie substantially flat against the side wall. Similarly, if the sheet is cut as in FIG. 4 at the bottom of the endmost rib, a triangular portion 25 of the rib can be folded against the outer face of the rib. While FIG. 4 shows the side walls 21 to extend only slightly above the ribs 13, it is contemplated that most homemakers would prefer to make the side walls 21 extend at least ½ to pb 1½ inches above the tops of the ribs 13 as a splash guard. High end walls can also be constructed by folding the ends of the sheet upwardly along folds lines spaced by a sufficient distance from the end edges of the sheet.

The pan 19 can be completely formed by finger pressure, as the aluminum foil from which the basic sheet material 11 is made is malleable under finger pressure conditions. Used once, the pan 19 is disposable by bending, balling up or folding up under finger pressure before it is discarded.

Figure 5:
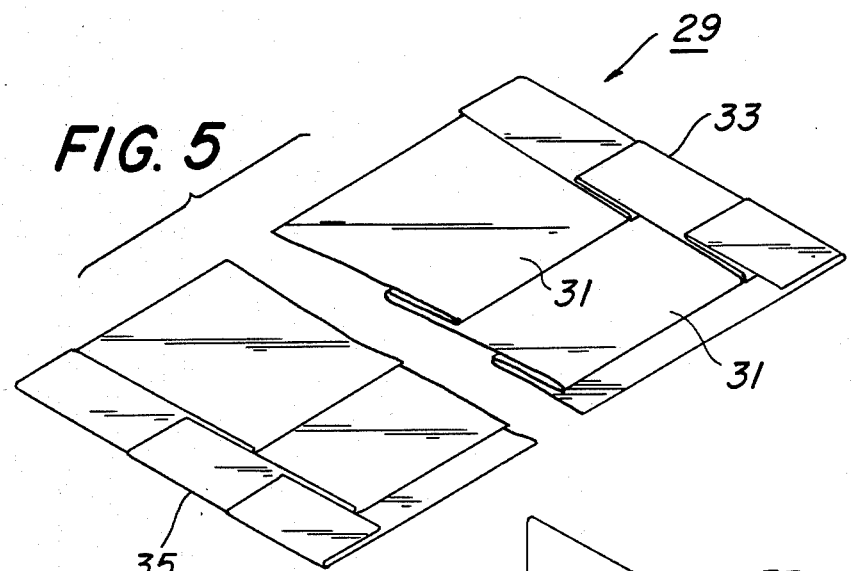
FIG. 5 is a fragmentary perspective view of a sheet of foil in accordance with an alternative embodiment of the invention in which the edges of the foil are folded over to provide reinforcements which help prevent the pleats from unfolding when the sheet is pulled.

FIG. 5 shows a foil sheet 29 having pleats 31 and having its side edges folded over at 33 and 35 to form narrow borders. The pleats are formed before the borders are folded over, and consequently the pleats continue into the folded-over borders. The folded borders at the edges of the sheets are an alternative to the score lines 12 described with reference to FIG. 1, and serve to resist unfolding of the pleats as a result of excessive tensile forces applied in directions parallel to the side edges of the sheet, for example in the process of dispensing the sheet from a roll.

Figure 6:
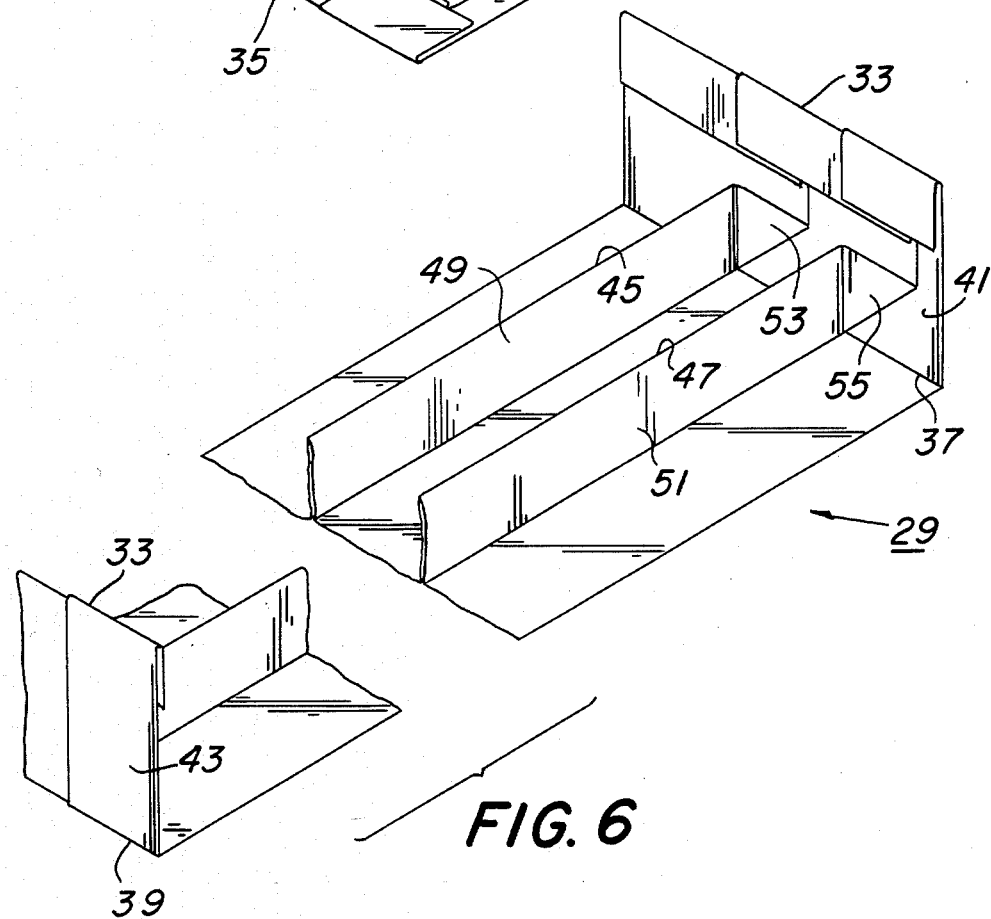
FIG. 6 is a fragmentary perspective view showing details of a broiler pan constructed from the sheet of FIG. 5.

FIG. 6 shows the sheet of FIG. 5 folded at 37 and 39 to form high side walls 41 and 43 respectively. These side walls extend higher than the plane defined by the upper edges 45 and 47 of ribs 49 and 51. FIG. 6 also shows the details of triangular folds 53 and 55 formed at the edges of ribs 49 and 51 respectively.

The pleated sheet of the invention can be made in a variety of widths. These widths can vary from six inches wide up to twenty-four inches wide as sizes commonly desirable for household or commercial use. The foil 11 can be a commercially available "extra heavy" aluminum foil as provided by Reynolds Aluminum Company. This foil is soft and pliable "O" tempered aluminum foil approximately 1.4 mils (0.0014 inches) thick. Pleats 13 extend about ⅜ to ½ inches in height when brought to a condition perpendicular to the floor of the pan being formed and are spaced about ¾ to 1 inches apart. A broiler pan 19 formed from the pleated foil sheet is useful for broiling chops, cuts of steak, bacon and other less heavy types of meat, fish and fowl. The weight of the aluminum can be increased to a width in the 2–5 mil range if large meat, fish or poultry pieces are to be broiled or baked. As an alternative, non-alloy aluminum in heavier gauge or an "F" tempered alloy aluminum can be used to make the foil. "O" tempered aluminum is fully annealed with a tensile strength of about 12,000–14,000 psi. and "F" tempered aluminum is work-hardened to a tensile strength of such about 19,000–21,000 psi. Other aluminum alloys such as 3003 and 5005 with intermediate tensile strengths could also be used.

By placing the upstanding ribs 13 closer together than ¾ to 1 inch spacing, the 1.4 mil foil 11 commonly available in the marketplace can be used for heavier weight means. Likewise the height of the upstanding ribs of ¾ to ½ inches can be reduced to as little as ⅛ to ¼ inches to provide greater strength.

It is contemplated that either an alloy or a non-alloy aluminum foil material ranging in thickness from 0.00024 inches to 0.006 inches will lend itself to the present invention. Likewise, the foil can be made thinner rather than thicker if its strength is increased by altering its metallurgical composition. Chromium, molybdenum, manganse, magnesium, iron and other metals can be added individually or in combination to form an aluminum alloy. Likewise, both alloy and the non-alloy aluminum sheet materials which are tempered by work hardening or are annealed to adjust tensile strengths can be used.

The pleats forming the upstanding ribs are preferably from ¼ inch to 1 inch high and spaced from ¼ inch to 2 inches apart, or wider. Not every pleat 13 need be raised. For example where a broiler pan of heavier gauge material is to be used for broiling a lighter weight meat, it may be sufficient to form the broiler pan with only every other pleat raised to form a rib. Further, in industrial applications, heavier or lighter gauge sheet stock may be needed. As an example, in processing very lightweight materials, a very lightweight foil stock (e.g. less than 0.00024 inches) can be used. For other industrial and commercial uses a much heavier gauge sheet stock may be needed (i.e. heavier than 0.006 inches).

Varying the strength of the aluminum sheet will not only affect the amount of weight the upstanding ribs 13 can carry, but also the formability of malleability of the material and makes it harder to form the assembled pan 19 with finger pressure. The height of the pleats or upstanding ribs 13 as well as their spacing likewise affects the load-carrying capacity of the ribs.

Additional variations can be made to the above-described invention in keeping with the present disclosure without departing from the intent and scope thereof. It is intended that this disclosure be read in the illustrative sense and the invention not limited thereby, and that such additional variations are within the scope of this invention.

I claim:

1. A flexible foil product formable into a disposable broiler pan having a series of spaced, parallel, food-supporting ridges extending upwardly from a floor surface of the pan comprising;

a flexible sheet of uniformly thin metal foil, the sheet having top and bottom faces, and first and second side edges extending parallel to each other;

spaced parallel pleats formed in the sheet and extending from one of said side edges to the other, each pleat being folded over throughout substantially its entire length so that its thickness is approximately three times the foil thickness and so that the sheet is freely manually bendable along lines parallel to and spaced from said first and second edges from a condition in which the entire sheet is substantially flat to a condition in which the portions of the sheet adjacent to the first and second side edges are bent upwardly to form side walls, and the portion of the pleats extending between side walls being manually unfoldable from the folded-over condition to form said food-supporting ridges.

2. A flexible foil product according to claim 1 in which the flexible sheet of metal foil has folded-over borders at both of said side edges, the pleats being continuous through said side edges and into said folded-over borders, whereby the folded-over borders resist unfolding the pleats when a tensile force is exerted against the sheet in a direction parallel to said side edges.

* * * * *